United States Patent [19]

Schwiesow

[11] 4,444,501

[45] Apr. 24, 1984

[54] STABILIZATION MECHANISM FOR OPTICAL INTERFEROMETER

[75] Inventor: Ronald L. Schwiesow, Boulder, Colo.

[73] Assignee: The United States of America as represented by the Secretary of Commerce, Washington, D.C.

[21] Appl. No.: 348,576

[22] Filed: Feb. 12, 1982

[51] Int. Cl.³ .............................................. G01B 9/02
[52] U.S. Cl. .................................... 356/346; 356/352
[58] Field of Search ................ 356/345, 346, 352, 358

[56] References Cited

FOREIGN PATENT DOCUMENTS 518643 6/1976 U.S.S.R. .............................. 356/346
789688 12/1979 U.S.S.R. .............................. 356/346

OTHER PUBLICATIONS

Woerner et al., "Precise Wavelength Calibration of a Pressure Scanned Flat Fabry-Perot Interferometer", *Rev. Sci. Instru.* vol. 47, No. 3, pp. 383-384, Mar. 1976.

Primary Examiner—William L. Sikes
Assistant Examiner—Matthew W. Koren
Attorney, Agent, or Firm—Eugene J. Pawlikowski; Alvin J. Englert

[57] ABSTRACT

A stabilizer for the relative mirror separation and inclination in a Michelson (two beam) or a Fabry-Perot (multiple beam) interferometer that generates at least three reference beams and in one embodiment an optional monitor beam. The reference beams are disposed substantially around the interferometer signal beam and are directed through the interferometer. The resultant intensity from the interference within each reference beam (transmission) is detected and compared to a fixed reference, in one embodiment the monitor beam. Based upon the ratio of reference intensity to fixed reference, the mirror position is controlled to maintain a constant spacing with respect to the wavelength of the reference source. A stepped mirror surface in the interferometer is used in one embodiment and provides a constant difference between effective mirror spacing encountered by a signal beam and the spacing encountered by reference beams. A servo system is provided to adjust mirror spacing to maintain a constant transmission ratio for each of the reference beams in response to distortion in the interferometer or changes in reference wavelength. A method of stabilizing a Michelson and a Fabry-Perot interferometer utilizing reference beams derived from an independent reference source of nearly monochromatic radiation is also disclosed.

14 Claims, 8 Drawing Figures

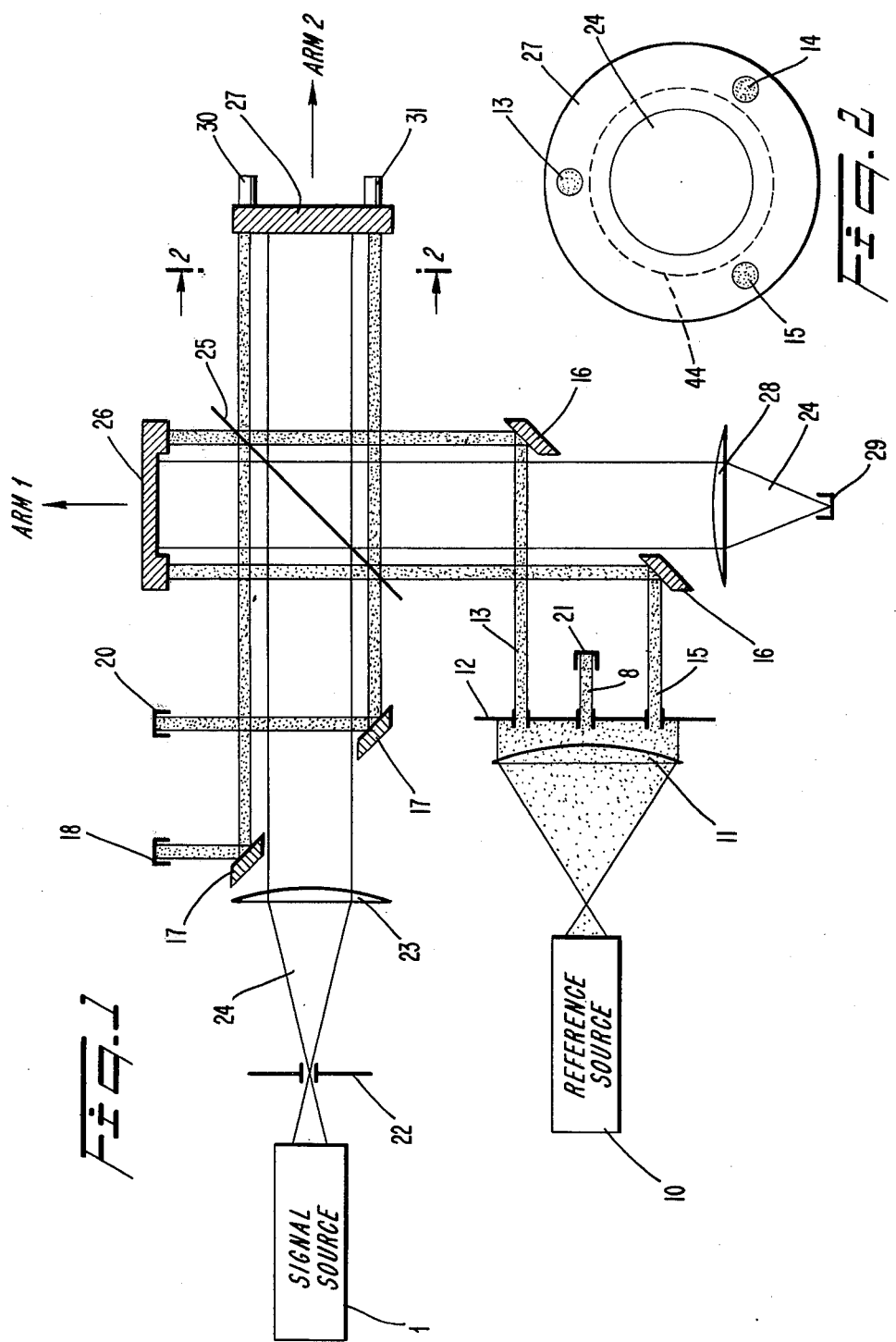

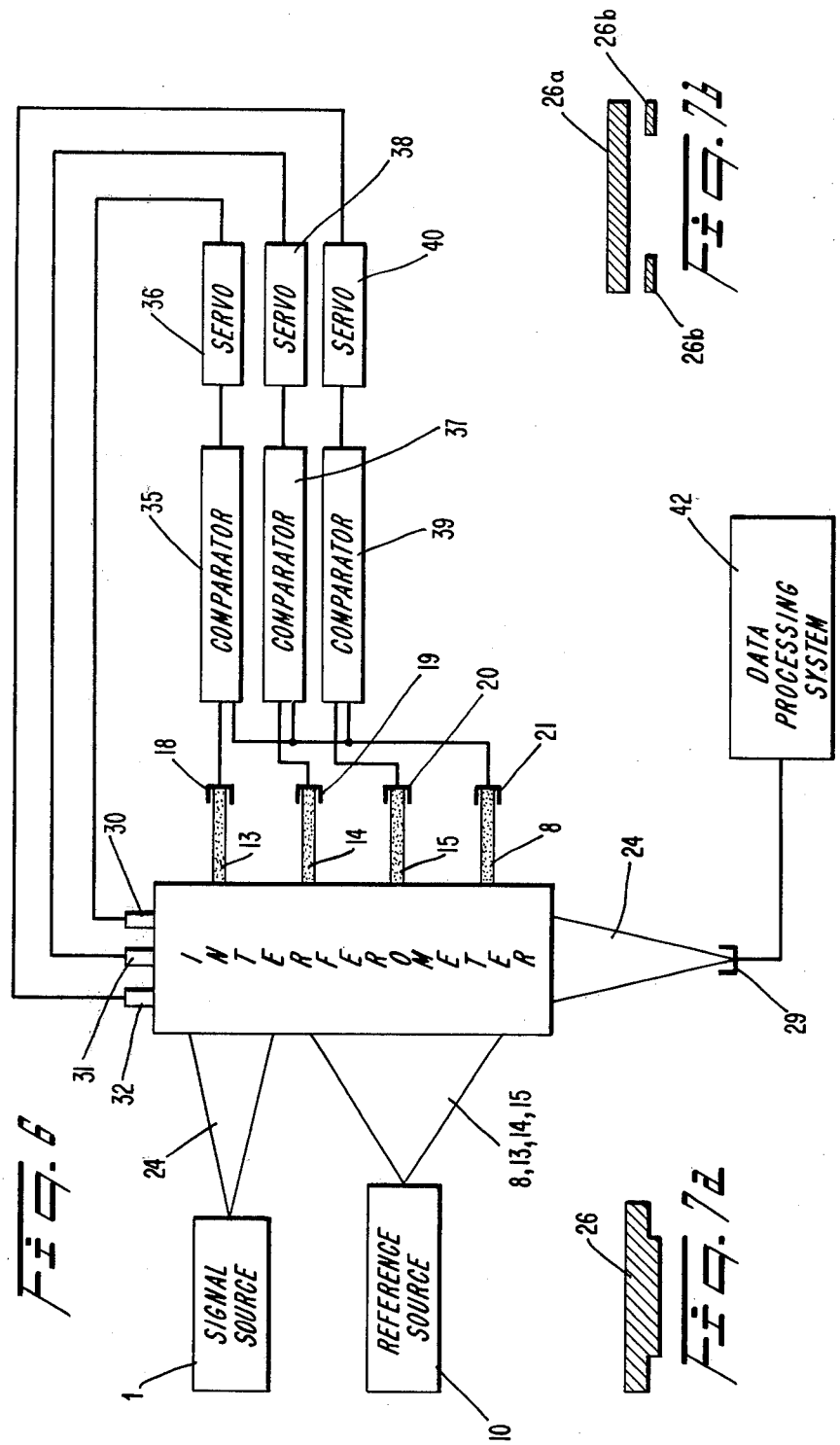

STABILIZATION MECHANISM FOR OPTICAL INTERFEROMETER

BACKGROUND OF THE INVENTION

This invention relates generally to optical interferometers of the type used to measure the spectrum of a narrow-band light source and, more particularly, to a method and apparatus for maintaining the separation of the reflecting plates at a desired relationship to a reference optical wavelength.

Spectral characteristics of light sources can be conveniently measured with optical interferometers. Two of such devices are the Fabry-Perot interferometer (multiple beam interference) and the Michelson interferometer (two beam in interference). In these interferometers, when the mirror separation or optical path length is changed in some way, the radiant power detected on the optical axis changes especially in the case of sources with interesting spectra. A substantial body of scientific and technological work relates to inferring the spectrum of the incident radiation (radiant power in a spectral interval vs. wave-length or frequency) from the interferogram (radiant power vs. optical path length).

In order to accurately measure an interferogram, the optical path length difference between optical elements of the interferometer (usually mirrors) must be known; and the angular alignment of the optical elements precisely maintained. One method of accurate positioning of the interferometer mirrors is mechanical or passive stabilization. Scan distance is determined by a lead screw or fixed spacer of some sort and very careful mechanical design is used to reduce the effects of creep, vibration, thermal changes, and other sources of dimensional error. Mirror alignment is also relatively stabilized by careful design and, in the case of the Michelson interferometers, retroreflectors of the "cat's eye" or cube corner type are sometimes used.

A second method for accurate positioning of optical elements is that of active stabilization. Active stabilization of interferometers is based on various techniques for sensing mirror separation coupled with electro-mechanical adjustment of mirror position by means of piezoelectric translators or motorized screws or wedges. One method of sensing spacing and parallelism of interferometer elements is by means of capacitance micrometers. Changes in distance, caused by physical factors, between capacitor plates, located on the mirror and some fixed point, respectively, are sensed. This technique has been applied, for example, to a Fabry-Perot interferometer manufactured by Queensgate Instruments Ltd., Franklin Road, London, England SE20 8MW. There is no fundamental relationship between the capacitance of the sensors and the wavelength of the incident spectrum so the relationship must be established empirically.

Another active stabilization method is to use the interferogram itself as a measure of separation and alignment. This method is feasible only if the spectrum contains a single sharp, distinct peak. The interferometer plate separation is changed by a small amount, and a logic circuit determines if the contrast of the interferogram has increased or decreased and so adjusts the direction of the subsequent change. A Fabry-Perot interferometer using this method is available from Burleigh Instruments, Inc., Fishers, N.Y. 14453. An additional disadvantage is that it is difficult to make quantitative spectral intensity measurements when the interferogram contrast is being changed for stabilization sensing.

Scanning Michelson interferometers are available where the interference fringes from a reference laser (usually HeNe) are counted to determine the optical path difference at any point of the scan. A reference interferometer is attached to the main interferometer such that the main and reference mirrors move together. Devices of this type are available from Nicolet Instrument Corp., 5225 Verona Road, Madison, Wis. 53711, Eocom Corp., 19722 Jamboree Boulevard, Irvine, Calif. 92664, and Bomem Inc., 910 Place Dufor, Vanier, Quebec, Canada. In these instruments the reference interferometers are used to measure the scan rather to stabilize the units at a fixed spacing.

Many very high resolution spectroscopy applications involve scattering from a laser source. Examples include Brillouin and Rayleigh spectroscopy in solids, liquids, and gases. Often these spectra are relatively simple, and many important features of the spectra can be inferred from one or a few interferometers operating at fixed optical path differences as specialized filters. In order to be useful, the intereferometers must have optical path differences set in a precise relationship to the wavelength of the laser source. One way to achieve this relationship, which is usually to operate at an extremum (a maximum or minimum) of the interferogram, is to tune the laser wavelength to match some multiple of the interferometer path difference as that path length difference changes from outside influences. A. Olsson et al. in *Applied Optics*, Vol. 19, No. 12, 1897 (1980) describe a device to tune a laser to an extremum of a passive interferometer by "dithering" the laser frequency around a central valve. This instrument is restricted to operate with a single interferometer and requires a tunable laser to work. Additional limitations of the instrument are that there is no provision for active alignment stabilization of the interferometer and that it must rely upon passive techniques for mirror tilt correction. A further disadvantage is that it is difficult to make quantitative transmission measurements when the interferometer transmission and laser wavelengths are being changed rapidly (dithered).

SUMMARY OF THE INVENTION

Therefore, it is an object of the present invention to provide an apparatus and method for the stabilization of an interferometer at an extremum of the interferogram, i.e., with the optical path difference in a fixed relationship to the wavelength of a single laser or other source or nearly monochromatic electromagnetic radiation used as a reference.

Another object of the present invention is to provide an apparatus and method for maintaining the fixed relationship between the optical path difference in the interferometer and the reference wavelength irrespective of changes in the reference wavelength.

A further object of the invention is to provide a method and apparatus for maintaining a relationship between interferometer path differences and reference wavelength without introducing an artificial fluctuation in the radiant power transmitted by the interferometer, i.e., without "dithering".

Still another object of the invention is to provide an apparatus and method to permit an interferometer to be stabilized to a laser source or reference when the stabilization device has no control of the laser source wavelength or radiant power output.

A still further object of the invention is to provide a quick response by a very accurate measuring of the departure of the interferometer optical path difference from the path difference giving an extremum of the interferogram so that corrections to the interferometer mirror position can be made before the transmission of the interferometer changes significantly.

The above and other objects are achieved in the present invention by providing a stabilized interferometer that maintains an optical path difference in a fixed (transmission extremum) relationship to the wavelength of a reference laser or other source of nearly monochromatic electromagnetic radiation, which may also serve as a source for a spectrometric experiment such as scattering. In a preferred embodiment, the reference beam (usually from a laser) is collimated and split into at least four separate beams. One beam is used to monitor the reference flux density, (providing a fixed reference) and the other three or more beams are introduced in a suitable way into the interferometer so that the reference beams are generally surrounding and at the periphery of the central signal beam, which has been directed into the interferometer for spectral analysis.

The mirrors of a Michelson interferometer or the reflective plates of a Fabry-Perot interferometer, for example, interact with the signal beam in the usual way. However, in a preferred embodiment, one of the mirrors is stepped in such a way that a known optical path difference is introduced between the signal and the reference paths. Being stepped means that the surface of the interferometer mirror is not smoothly flat or spherical, but that selected portions (those that interact with the reference beam) are raised or lowered a small amount with respect to the surface that interacts with the signal beam. The stepped mirror creats an optical phase difference between the signal and reference paths.

When the separate portions of each reference beam are recombined interferometrically, the resulting radiant power in proportion to a fixed reference (the flux density monitor beam in one embodiment) is a sensitive measure of the optical delay encountered by the reference beam in its portion of the interferometer. A number of electronic servo systems (one for each interferometer reference beam, usually three) then act on the mirror position to adjust the mirror position such that the ratio of the radiant power in each reference beam to the monitor power is held to a constant value.

If the reference laser drifts in wavelength, all reference-to-monitor ratios would tend to drift, and the servo system would change the mirror position to account for the wavelength drift. Similarly, if the interferometer framework distorts from thermal or mechanical causes, the servo system adjusts the electromechanical (usually piezoelectric) mirror mounts to compensate for the distortion and maintain a constant optical path difference (in terms of wavelength) and precise mirror alignment.

The size of the step in one interferometer mirror is chosen so that when the signal path part of the interferometer is at an extremum, the reference part of the interferometer is set to an optical path difference so that the transmitted power is approximately midway between the transmitted power at a minimum and maximum of the interferogram. If the interferometer is set at a minimum of the interferogram, for example, both an increase and a decrease in the optical path difference will increase the detected signal power. However, if the reference optical delay is set at a transmission midpoint, an increase in optical path will increase the reference-to-monitor ratio and a descrease in path will decrease the ratio (or conversely, depending on the phase of the reference-to-signal difference). Thus, the servo correction can be made in the proper direction without the need for dithering. In addition, with the reference interferometer at a transmission midpoint, the change in reference-to-monitor ratio for a given change in optical path difference will be much larger than the fractional change in transmitted signal at an extremum for the same change in optical path.

The stabilization method and apparatus is applicable to a number of interferometers operating from a common reference source, because no control of the wavelength or radiant power output of the reference source is required.

BRIEF DESCRIPTION OF THE DRAWINGS

A more complete appreciation of the invention, and many of the attendant advantages thereof, will be readily apparent by reference to the accompanying drawings, wherein:

FIG. 1 is a plan view of a stabilized Michelson interferometer modified in accordance with the present invention;

FIG. 2 is a cross-sectional view along section lines 2—2 in FIGS. 1 and 3 of the optical path in the interferometer;

FIG. 6 is an electrical block diagram of a preferred embodiment of the overall stabilization system; and FIGS. 7a and 7b are side cross-sectional views of further embodiments of the mirror 26 in FIGS. 1 and 3.

DETAILED DESCRIPTION OF THE PREFERRED EMBODIMENT

Figure 3:
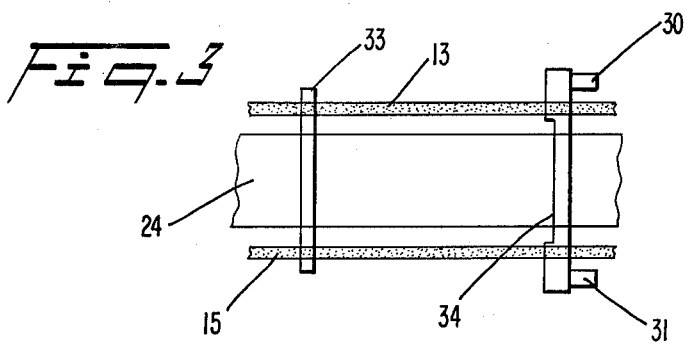
FIG. 3 is a side view of a portion of a stabilized Fabry-Perot interferometer modified in accordance with the present invention.

Referring now more particularly to the drawings, wherein like numerals represent like elements throughout the several views, FIG. 1 depicts a modified Michelson interferometer. Use of the term "optical" in this specification is not intended to limit the invention to visible wavelengths of electromagnetic radiations but is intended to be inclusive, because the invention is applicable to all wavelengths of electromagnetic radiation for which interferometers can be used.

1. MODIFIED MICHELSON INTERFEROMETER

A reference source 10, which can be a laser, vapor discharge lamp, or other source of narrow-band (nearly monochromatic) radiation, is divided into at least three and preferably four beams. One method for producing the beams is to use a collimating lens 11 and aperture mask 12 with a plurality of holes. A fixed reference is provided by monitoring the flux density of the reference source through monitor beam 8. The three required reference beams (only beams 13 and 15 are shown in FIG. 1 for clarity) are arranged around the periphery of the interferometer. The reference beams 13 and 15 and monitor beam 8 are shown stippled to identify them separately from the signal beam 24, which is shown in outline. Mirror 16 with a central hole for the signal beam introduces the reference beam around the signal beam. After the reference beams pass through the interferometer, they are separated from the signal beam by mirror 17 also having a central hole therein. Components of each of the reference beams represented by beams 13 and 15 interfere on and are detected by separate detectors for each beam, represented by 18, 19 and 20. Detector 21 measures the flux density of the monitor beam 8 to provide a fixed (relative to the reference source) reference.

The Michelson interferometer in FIG. 1 with the exception of mirror 26 and the reference beam system is of the type often used in the art. Electromgnetic radiation from a signal source 1, which is to be studied, is formed into a signal beam 24 and collimated by the use of aperture 22 and lens 23. The signal beam 24 is divided into two approximately equal beams by beamsplitter 25. Each of the two beams is reflected at its corresponding mirror 26 and 27, and the beams are recombined by beamsplitter 25. Both components of beam 24, one delayed with respect to the other by the different lengths of the two arms of the interferometer, are focused by lens 28 onto detector 29 where the interference of the two components of beam 24 is detected. There are electromechanical transducers 30, 31 and 32, corresponding to each reference beam, in order to position one of the interferometer mirrors (26 or 27) with respect to the other. The transducers of which there must be at least three are represented by components 30, 31, and 32 which serve to translate and tip one mirror with respect to the other. A cross-section of the beams in the interferometer is shown in FIG. 2. Reference beams represented by 13, 14 and 15 are shown stippled. At least three reference beams surround the signal beam 24. An optical tubular shield 44 may be used to separate signal and reference paths. All beams are reflected by the interferometer mirrors, of which mirror 27 is shown for example.

Figure 4:
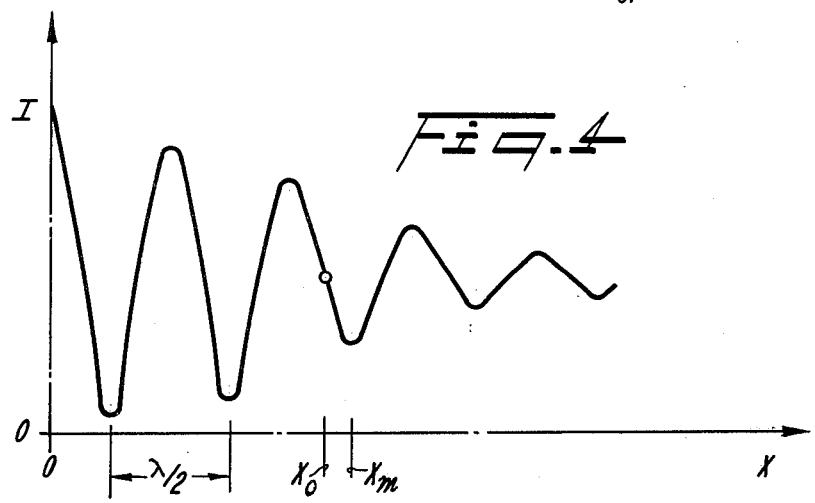
FIG. 4 is a graph of the radiant power I transmitted through a Michelson interferometer, on axis, as a function of the position X of the moveable mirror in one of the arms.

Mirror 26 is an important and unique feature of the instant invention. The optical path difference between the two arms of the interferometer *is different* for signal and reference beams *by a fixed amount* that depends on the configuration of the mirror. Mirror 26 is stepped; i.e., the portion of the mirror surface that reflects the reference beams is raised or lowered a small amount with respect to the portion that reflects the signal beam. The functional effect of the stepped mirror can be seen with the help of FIG. 4. If the position of one mirror with respect to the other is some distance X, the optical path length will be 2X and the interferogram is as given in FIG. 4. It is an object of the present invention to stabilize the mirror separation at a distance corresponding to an extremum of the interferogram, for example, the minimum of the interferogram indicated at $X_m$. If the step in mirror 26 is approximately $\lambda/8$, where $\lambda$ is the wavelength of the reference source, the mirror position for the reference beams is $X_o$ as shown. At position $X_o$, the transmitted radiant power I is approximately one-half the maximum radiant power in the reference beam. Transmission of one half is a ratio of reference power in detectors 18, 19 and 20 to monitor power in detector 21 of one half, if detector gains and areas are properly matched.

A step in mirror 26 of $\lambda/8$ permits a mirror position so that the signal path is maintained at $X_m$ while the reference-to-monitor beam power ratio is maintained at $\frac{1}{2}$. A servo system adjusts the position of mirror 27 by means of three or more electromechanical transducers, represented by 30, 31 and 32. If some outside influence tends to change $X_o$ (and thereby $X_m$), the reference/monitor power ratio will change, causing the servo system to drive the electromechanical positioners 30, 31 and 32, moving the mirror 27 in such a way that the reference monitor ratio retains its original value of $\frac{1}{2}$. As shown, an increase in $X_m$ and $X_o$ will reduce the reference/monitor ratio and cause the position transducers to reduce the X position such that the power ratio increases to $\frac{1}{2}$.

This embodiment provides for the stabilization of any number of interferometers to a common source because the stabilization apparatus acts only on each individual interferometer. No dithering of the mirror position is required because the invention provides an error signal to the correction system with a sign that depends on the sign of the departure from the desired position. If the wavelength of the reference source changes, the interferogram will shift. For example, an increase in reference wavelength will stretch the interferogram, having the same effect as a decrease in $X_m$ and $X_o$ because $X_m$ is a certain multiple of $\lambda/4$ at an extremum of the interferogram in FIG. 4. An increase in wavelength will increase the reference/monitor ratio and cause the position transducers 30, 31 and 32 to increase the mirror separation until the power ratio is reduced to $\frac{1}{2}$ and the mirror position again provides a minimum of the signal interferogram. This operation of the apparatus also insures that the stabilized interferometer follows changes in reference source wavelengths. Note that the reference/monitor power ratio is measured at the steepest part of the interferogram. That is, a change in $X_o$ and ($X_m$) will cause the largest possible change in the reference/monitor ratio if the ratio is maintained near $\frac{1}{2}$. Conversely, the fractional change in transmitted signal intensity I is relatively much less than the change in reference/monitor ratio if the signal path is maintained at an extremum of the interferogram. This accounts for the extreme accuracy of the device and method.

Many alternative forms of mirror 26 are possible to provide the difference in optical path length between the signal and reference beams in accordance with the invention. The reference portion of mirror 26 may be raised as shown in FIG. 1. The raised portion may be an annulus about the signal portion or may be separate areas corresponding to the reference beams. The reference portion of 26 may be lower than the signal portion shown in FIG. 7a. Another way to introduce the optical path difference between reference and signal beams is to use a flat mirror 26A and retarding element 26B as shown in FIG. 7b. The retarding element can be isotropic or a birefringent waveplate, depending on the polarization state of the reference beams. Either the signal beam may be retarded with respect to the reference, or the converse arrangement may be used. The effective difference in mirror separation for signal and reference beams is not constrained to be $\lambda/8$ but may be any odd multiple of $\lambda/8$ depending on manufacturing convenience. In fact, a separation distance of exactly $\lambda/8$ is not necessary although this is a preferred embodiment. The goal is to operate with the reference/monitor power ratio near $\frac{1}{2}$. Departure of the dimension of the mirror step from $\lambda/8$ can be trimmed out by adjustment of the servo system such that the mirror position is correctly maintained. Reference beams 13, 14 and 15 may propagate counter to the signal beam 24 as shown in FIG. 1 or may propagate in the same direction depending on details of the scattered light in the interferometer chosen. Mirrors 16 and 17 may be annular or may have separate segments for each reference beam. A variety of methods exist, and are well known to those of ordinary skill in the art, to obtain separate reference beams from the reference source. Rather than the lens 11 and mask 12 shown in FIG. 1, for example, various arrangements of beamsplitters or other elements could be used. Further, electromechanical positioners may be attached to either mirror 27 or 26.

2. MODIFIED FABRY-PEROT INTERFEROMETER

The invention may also be embodied in a form suitable for stabilization of a Fabry-Perot (multiple beam) interferometer to a reference source. A schematic diagram of part of the optical arrangement is shown in FIG. 3, which shows only the interferometer part of the apparatus. Elements 10, 11 and 12 for producing reference beams 13 and 15 (two instead of three are shown for clarity) and monitor beam 8 can be the same for the Fabry-Periot in FIG. 3 as for the Michelson in FIG. 1. Similarly, reference beam handling by mirrors 16 and 17 and detection by 18, 19 and 20 can be the same. Elements 1, 22 and 23 of FIG. 1 for handling source beam 24 are also applicable to the arrangement in FIG. 3, as are signal detection elements 28 and 29.

In FIG. 3, Fabry-Perot partially reflecting plates 33 and 34 comprise the interferometer. Electromechanical positioners, of which there must be at least three, are represented by 30 and 31 (beam 14 and positioner 32 are omitted for clarity). A cross-section of the interferometer showing signal beam 24 surrounded by reference beams represented by 13, 14 and 15 would be indentical to FIG. 2 except mirror 27 would be considered to be reflecting plate 34. An optical tubular light shield 44 may also be used to separate signal and reference sections to the interferometer.

Figure 5:
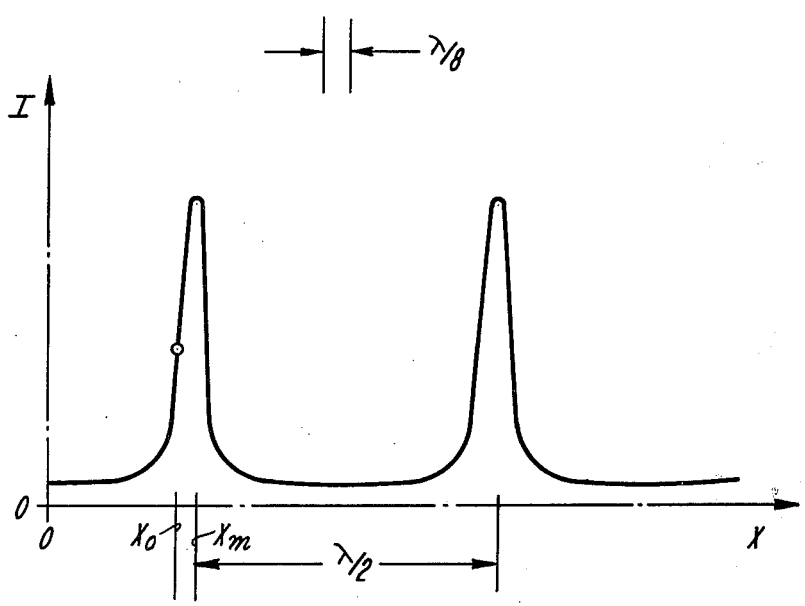
FIG. 5 is a graph of the radiant power I transmitted through a Fabry-Perot interferometer, on axis, as a function of the distance X between the reflective plates.

Again, one key element of the instant invention for a stabilized Fabry-Perot interferometer in FIG. 3 is stepped reflecting plate 34. This stepped plate 34 is analogous to the mirror 26 of the previously described embodiment for a Michelson interferometer except that the step size will not be $\lambda/8$. The interferogram showing the intensity I transmitted by a Fabry-Perot interferometer as a function of the position X of one mirror with respect to plate 34 is shown in FIG. 5. The sharpness of the transmission peaks depends on the finesse of the interferometer, which in turn depends on mirror reflectivity and flatness among other factors. A maximum of the interferogram occurs at mirror separation $X_M$, and it is desirable to hold the mirror separation for the signal path at $X_M$ with respect to the wavelength of the reference source in spite of changes in the interferometer support dimensions or reference wavelength. The separation between the reference beam portions of plates 33 and 34 is set to $X_o$ in FIG. 5 so that the transmission of reference beams 13, 14 and 15 is approximately $\frac{1}{2}$, i.e., so that the reference/monitor detected radiant power ratio is $\frac{1}{2}$. The mirror step size $X_M-X_o$ is determined by a particular Fabry-Perot finesse so as to place $X_o$ at a midpoint on the intensity curve. Of course the $X_M-X_o$ step size need not be chosen to be much smaller than $\lambda/2$ as shown because $X_M$ and $X_o$ could be on different peaks of the interferogram. The sharpness or steep slope of the Fabry-Perot peaks means that a closer tolerance on $X_M-X_o$ is required for a Fabry-Perot than for a Michelson interferometer in order to achieve a reference/monitor ratio near $\frac{1}{2}$.

The functioning of the invention as applied to a Fabry-Perot interferometer is the same as in the case of a Michelson interferometer. Changes in the mirror support structure or reference source wavelength are corrected for by a servo system acting on positioners 30, 31 and 32 for example to maintain the power ratios of representative detectors 13, 14 and 15 to monitor detector 8 at a preset level near $\frac{1}{2}$.

3. MIRROR CONTROL SYSTEM

A preferred embodiment of a control system of the present invention is shown in FIG. 6. Reference source 10 provides reference beams 13, 14, 15 and monitor beam 8 into the interferometer, which has stepped mirrors and may be of either Michelson or Fabry-Perot type. Signal source 1, beam 24, detector 29, and data processing system 42 for the signal path do not enter directly into the stabilization apparatus except that it is desired that the interferogram for the signal be maintained at an extremum for a reference source wavelength. Detectors 18, 19 and 20 for reference beams 13, 14 and 15 are compared to the output of detector 21 for monitor beam 8. The radiant power in each reference beam 13, 14 and 15 is compared to the power in monitor beam 8 in comparators 35, 37 and 39 for each reference channel in order to determine the reference/monitor ratio for each channel. If the ratio departs from a preset level near $\frac{1}{2}$, an error signal is fed into servo 36, 38 or 40 for each channel. The servo then changes the drive voltage to electromechanical positioners 30, 31 and/or 32 to change the mirror position and thus correct the reference/monitor ratio.

Some typical components that may comprise the elements of the disclosed invention include: for mirrors 26 and 34, flat, dielectric (vacuum-deposited) coated mirrors with the step applied to the substrate by vacuum deposition with a partial mask covering the signal portion of the mirror before coating the entire mirror with a high-reflection coating; for mirrors 27 and 33, flat, dielectric coated mirrors; for mirrors 16 and 17, standard front-surface aluminized flat mirrors; for detectors 18, 19, 20 and 21, silicon photodiode with integrated amplifier model OS15-K available from Centronic, 1101 Bristol Road, Mountainside, N.J. 07092; for reference source 10, an argon laser model 95-4, available from Lexel Corporation, 928 E. Meadow Drive, Palo Alto, Calif. 94303; for signal source 1, the argon laser light scattered from a fluid target of interest; for electromechanical positioners 30, 31 and 32, PZAT piezoelectric drive model PZ-81, available from Burleigh Instruments, Inc., Fishers, N.Y. 14453; for comparators 35, 37 and 39, integrated circuit operational amplifiers type LN0042 with differential input; for servos 36, 38 and 40, LN0042 op amps with adjustable bias as offset drivers for high voltage operational amplifiers model 604 available from Trek, Inc., 1674 Quaker Road, Barker, N.Y. 14012.

It will be obvious to one of ordinary skill in the art that the above method and apparatus can be utilized other than as specifically discussed above. For example, the method of using a difference in signal beam path and reference beam path to provide a reference signal which varies substantially when the relative mirror spacing or reference wavelength changes very slightly can be used not only to control servo actuators to position mirrors to maintain an interferometer at an extremum of the interferogram but also to provide a signal output indicative of the distance and/or wavelength change. This may well be useful in the automatic processing of optical equipment and in other fields. It is the applicant's recognition that by providing a difference in signal and reference beam path length, a large error output can be generated when the signal interferogram is at an extremum, and is a major aspect of the present invention. The application of this method to interferometers other than those above will be obvious to one of ordinary skill in the art in view of the above teachings. Therefore, the present invention is not limited to the embodiments and applications expressed herein and is only limited in accordance with the appended claims.

The embodiments of the invention in which an exclusive property or privilege is changed are defined as follows:

1. A method of providing a signal output indicative of at least one of a change of wavelength of electromagnetic radiation from a reference source and the spacing between and relative alignment of the mirrors of an at least one arm interferometer having a signal beam and a signal beam path, said method comprising the steps of:
   generating at least one reference beam adjacent a signal beam;
   generating a reference signal;
   directing said at least one reference beam through said interferometer with said reference beam path having an optical path length different from a signal beam path length in one arm of said at least one arm interferometer;
   directing a signal from interference within said reference beam, said detected signal at a substantially one-half power point when the inteference within said signal beam is at a relative extremum, said one-half power point due to said difference in path lengths; and
   comparing said resultant detected signal to said reference signal, with any change in said comparison comprising said desired output.

2. A method of maintaining the spacing between and relative alignment of the mirrors of an at least one arm interferometer, said spacing with respect to a reference source wavelength, said interferometer having a signal beam and a signal beam path, said method comprising the steps of:
   generating at least three reference beams around said signal beam each reference beam having a reference beam path;
   generating a reference signal;
   directing each of said reference beams through said interferometer with a reference beam path having an optical path length different from that of said signal beam path in one arm of said at least one arm interferometer, said path length difference sufficient to generate an interference intensity of substantially half power in said reference beam when the interference within said signal beam is at a relative extremum;
   detecting a signal from the resultant intensity from interference within each reference beam; and
   adjusting relative mirror position and inclination based upon the relationship between the detected signal from each of the reference beam and said reference signal.

3. The method according to claim 2, wherein prior to said first generating step there is the further step of stabilizing said interferometer to a mirror separation giving a relative extremum of transmission for radiation of the same wavelength as the reference source.

4. The method according to claim 2, wherein said directing step includes providing the interferometer with a stepped mirror to maintain a constant difference between mirror spacing encountered by said signal beam and the mirror spacing encountered by said reference beams disposed around said signal beam.

5. An apparatus for providing a signal output indicative of at least one of a change of wavelength of electromagnetic radiation from a reference source and the spacing between and relative alignment of the mirrors of an interferometer having a signal beam, said apparatus comprising:
   an interferometer having at least two reflective plates and a signal beam following a signal beam path;
   means for generating at least one reference beam having a reference beam path, said reference beam adjacent said signal beam;
   means for generating a reference signal;
   means for directing said at least one reference beam through said interferometer with said reference beam path having an optical path length different from said signal beam path and for securing interference intensity in said reference beam at a detecting means is substantially at a half power point when the interference within said signal beam is at a relative extremum;
   means for detecting the resultant interference intensity of said at least one reference beam and generating a signal based thereupon; and
   means for comparing said generated signal to said reference signal, said comparison comprising said apparatus signal output.

6. An apparatus for maintaining the spacing between and relative alignment of the mirrors in an interferometer, said spacing being maintained with respect to a reference source wavelength, said interferometer having a signal beam and a signal beam path, said apparatus comprising:
   means for generating at least three reference beams around said signal beam each reference beam having a reference beam path;
   means for generating a reference signal;
   means for directing each of said reference beams through said interferometer with a reference beam path having an optical path length different from said signal beam path and for insuring interference intensity in said reference beam at a detection means is substantially at a half power point when the interference within said signal beam is at a relatively extremum;
   means for detecting the resultant interference intensity of each reference beam and generating a signal based thereupon;
   means for comparing said generated signal with said reference signal; and
   means, responsive to said comparing means, for adjusting relative mirror position and inclination.

7. An apparatus according to claim 6, wherein said reference beam generating means generates a fourth reference beam and said reference signal generating means comprises a means for detecting the transmission intensity of said fourth reference beam wherein said directing means does not direct said fourth reference beam through said interferometer.

8. The apparatus according to one of claims 6 or 7, wherein said apparatus is a Michelson interferometer and said means for directing includes an interferometer mirror in which the reference beam path is shorter than said signal beam path by an amount equal to an integral multiple of $\frac{1}{8}$th the wavelength of said reference source.

9. The apparatus according to one of claims 6 or 7, wherein said apparatus is a Michelson interferometer and said means for directing includes an interferometer mirror in which the reference beam path is longer than said signal beam path by an amount equal to an integral multiple of $\frac{1}{8}$th the wavelength of said reference source.

10. The apparatus according to claim 8, wherein one of said interferometer mirrors has a reference reflecting portion raised with respect to a signal reflecting portion, said reflecting portion raised an amount equal to $\frac{1}{8}$th the wavelength in the beam path direction.

11. The apparatus according to claim 9, wherein one of said interferometer mirrors has a reference reflecting portion lowered with respect to a signal reflecting portion, said reflecting portion lowered an amount equal to $\frac{1}{8}$th the wavelength in the beam path direction.

12. The apparatus according to claim 7, wherein said comparing means comprises a separate comparator for each of said at least three reference beams and said adjusting means comprises a separate adjusting means responsive to each of said separate comparators, said comparators and adjusting means comprising a means for maintaining a ratio of detected reference intensity to said fixed reference at $\frac{1}{2}$.

13. The apparatus according to one of claims 6 or 7, wherein said interferometer is a Michelson interferometer.

14. The apparatus according to claims 6 or 7, wherein said interferometer is a Fabry-Perot interferometer.

* * * * *